UNITED STATES PATENT OFFICE.

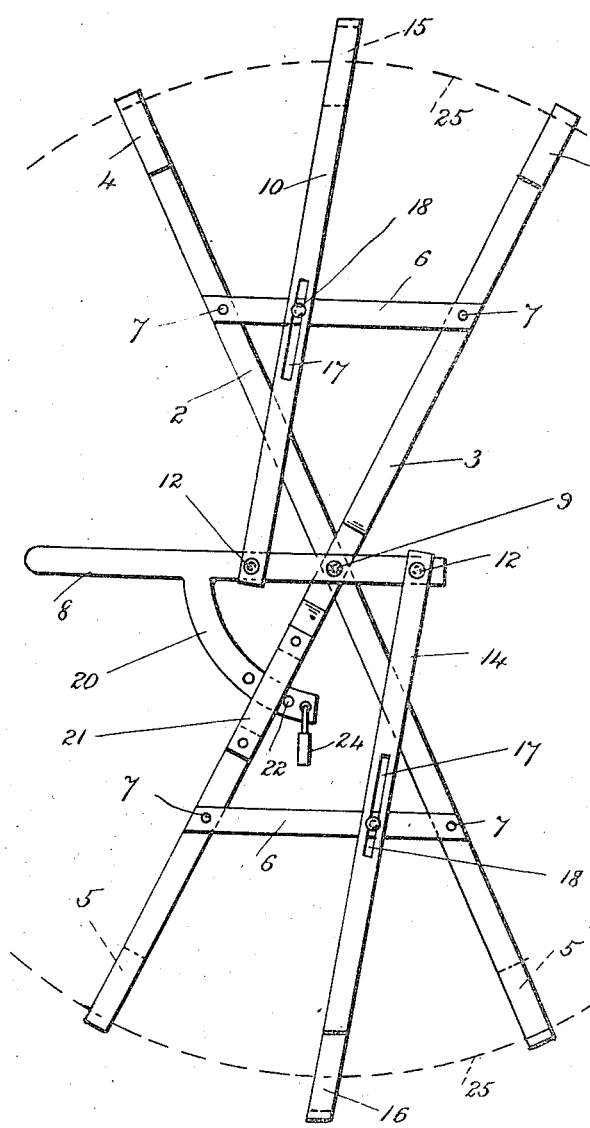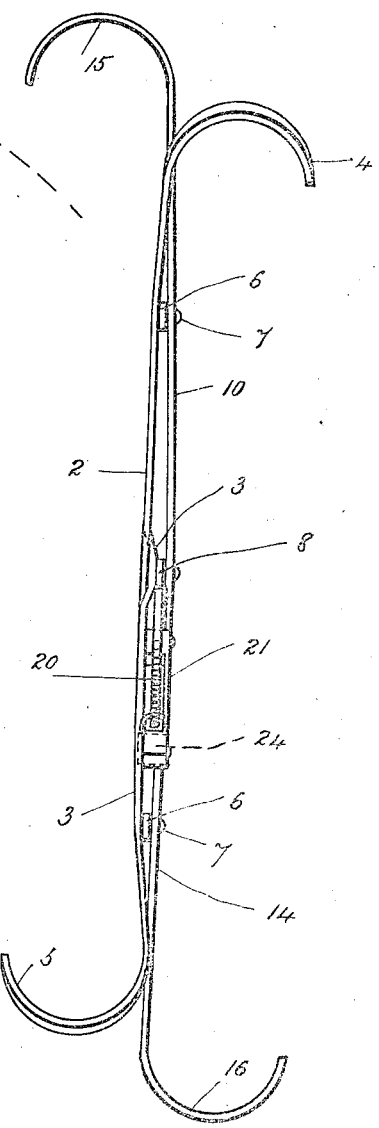

CLAUDE T. LUKE AND JOHN R. LILLY, OF DEFIANCE, OHIO.

TIRE-CARRIER.

1,325,993. Specification of Letters Patent. Patented Dec. 23, 1919.

Application filed April 28, 1919. Serial No. 293,132.

*To all whom it may concern:*

Be it known that we, CLAUDE T. LUKE and JOHN R. LILLY, citizens of the United States, residing at Defiance, in the county of Defiance and State of Ohio, have invented certain new and useful Improvements in Tire-Carriers, of which the following is a specification.

This invention relates to means for supporting spare wheel tires on motor cars; and it consists in the novel construction and combination of the parts hereinafter fully described and claimed whereby one tire is supported from another tire, both tires being secured together.

In the drawings, Figure 1 is a front view of a tire carrier constructed according to this invention. Fig. 2 is a side view of the same.

Motor cars are provided with various devices for supporting a spare tire, and the carrier of the present invention enables a second spare tire to be attached to the first spare tire so that it can be carried with it.

Two similar bars 2 and 3 are provided and have hooks 4 and 5 at their opposite ends. The hooks are all alike but the hook 4 at one end of each bar is bent in the opposite direction from the hook 5 at its other end. The bars are secured crosswise of each other in the form of a letter X, and braces 6 are secured between their arms by rivets 7 so that they are rigidly connected together so as to form an X-shaped frame. The hooks 4 of the pair at the top of the frame are bent to project in the same direction, and they project in the opposite direction from the hooks 5 of the pair at the bottom of the frame.

A hand lever 8 is pivoted to the center part of the frame by a pin 9. A bar 10 is pivoted by a pin 12 to the lever 8 on one side of its pivot 9, and a similar bar 14 is pivoted to the lever on the opposite side of its pivot. The bar 10 has a hook 15 which projects in the opposite direction from the hooks 4 and is arranged between them.

The bar 14 has a similar hook 16 which projects in the opposite direction from the hooks 5, and is arranged between them. Each bar 10 and 14 has a longitudinal slot 17 at its middle part which is slidable over a guide pin 18 which projects from the brace 6 under the bar.

The hand lever is provided with a locking device which preferably consists of a curved arm 20 arranged concentric with the pivot 9 of the lever, and which is slidable in a guide 21 secured to one of the bars of the frame. The arm 20 has holes 22, and 24 is a lock, such as a padlock of approved construction, adapted to engage with the holes in the arm and prevent it from being retracted in its guide. The position of each tire is indicated by the dotted circle 25.

Each tire is engaged by three hooks, and the two tires are connected together by the hooked frame. One tire is engaged by the hooks 4, 4, and 16, and the other tire is engaged by the hooks 5, 5, and 15. The hand lever is used to slide the bars 10 and 14 radially of the pivot pin 9 at the center of the frame, so that they are moved to grip and to release the two tires according to the direction in which the lever is moved. This carrier is light and strong, is inexpensive to construct, and will hold a second spare tire securely connected to the spare tire which is ordinarily carried on a motor car.

What we claim is:

1. A tire carrier, comprising an X-shaped frame having hooks which project in opposite directions and which are arranged in pairs, and pivoted lever mechanism operating to hold two tires in engagement with the said pairs of hooks.

2. A tire carrier, comprising an X-shaped frame having hooks which project in opposite directions and which are arranged in pairs, and two fastening bars provided with hooks and slidably connected with the frame and projecting between the hooks of the said pairs and operating to hold two tires in engagement with the hooks of the frame.

3. A tire carrier, comprising an X-shaped frame having hooks which project in opposite directions and which are arranged in pairs, a hand lever pivoted at the middle part of the frame, and bars provided with hooks and pivoted to the said lever on opposite sides of its pivot and operating to hold two tires in engagement with the said pairs of hooks.

4. A tire carrier, comprising an X-shaped frame having hooks which project in opposite directions and which are arranged in pairs, a hand lever pivoted at the middle part of the frame, bars provided with hooks and pivoted to the said lever on opposite sides of its pivot and operating to hold two tires in engagement with the said pairs of hooks, and a locking device for securing the hand lever to the frame.

5. A tire carrier, comprising an X-shaped frame having hooks which project in opposite directions and which are arranged in pairs, crossbars secured to the arms of the frame and provided with guide pins, a hand lever pivoted to the middle part of the frame, and bars provided with hooks and having slots for engaging with the said guide pins, said bars being pivoted to the said lever on opposite sides of its pivot and adapted to hold two tires in engagement with the said pairs of hooks.

In testimony whereof we affix our signatures.

CLAUDE T. LUKE.
JOHN R. LILLY.